June 11, 1929.                S. R. HOWARD                1,716,853
                            BOX MAKING MACHINE
                         Filed Sept. 29, 1925           2 Sheets-Sheet 2
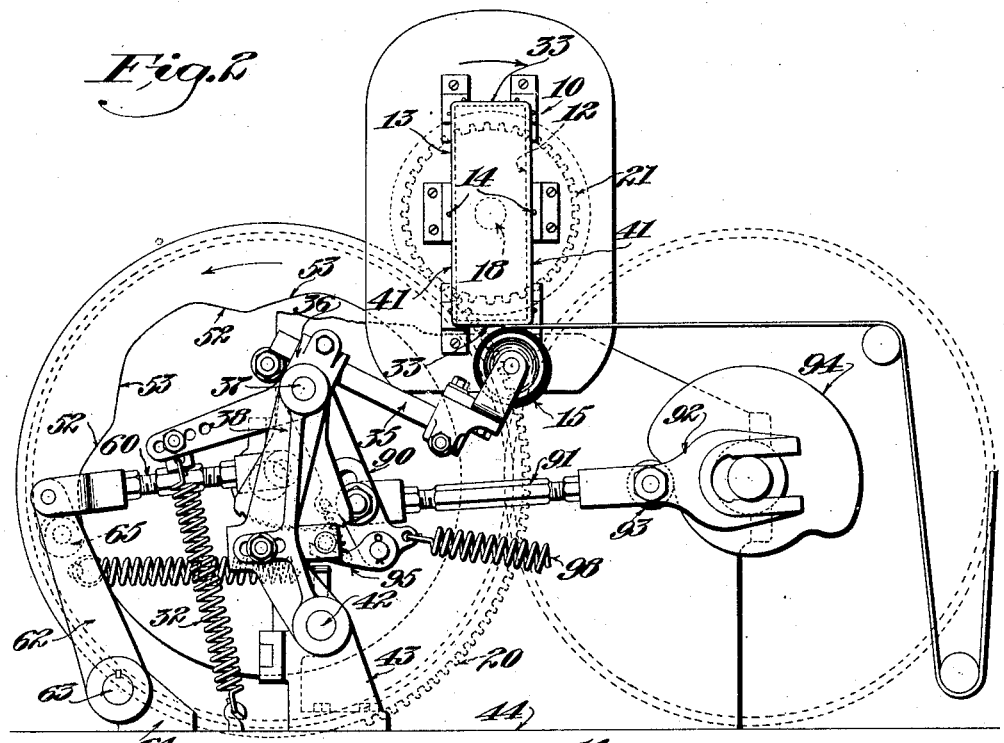
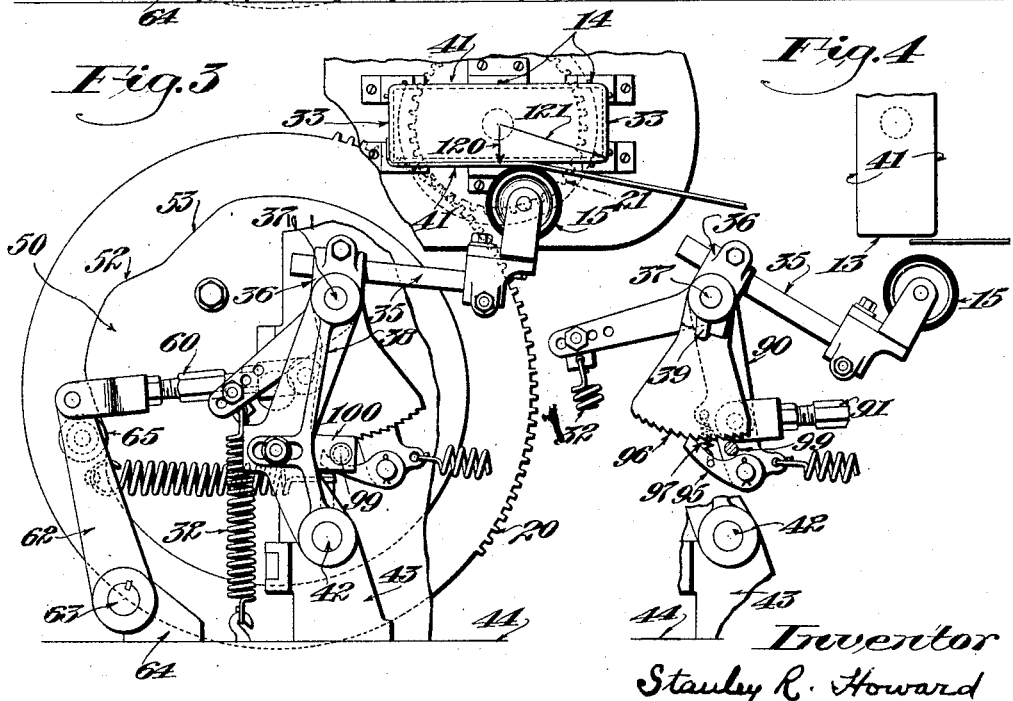
Inventor
Stanley R. Howard
by J. Stanley Churchill
         atty.

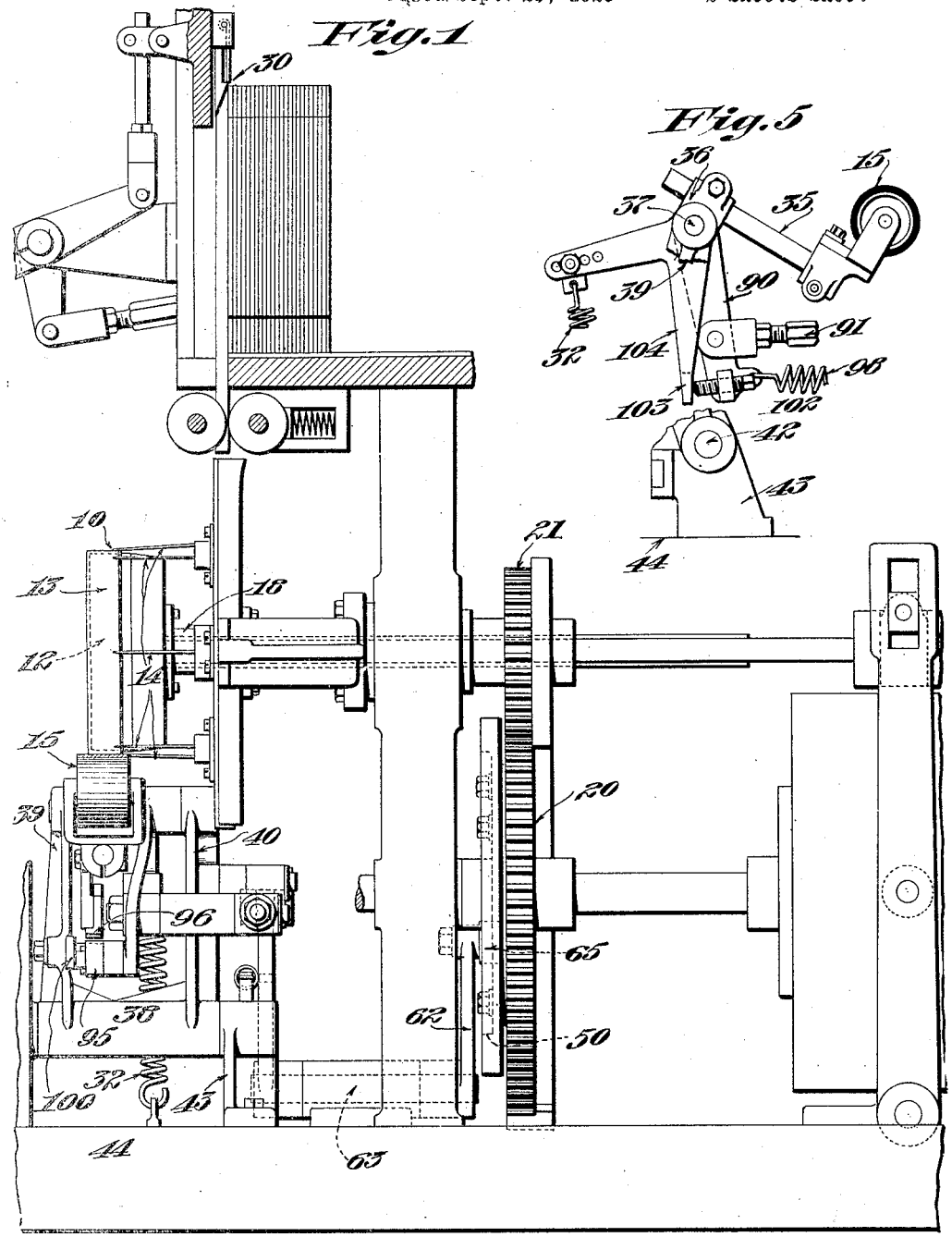

Patented June 11, 1929.

1,716,853

UNITED STATES PATENT OFFICE.

STANLEY R. HOWARD, OF EAST MILTON, MASSACHUSETTS, ASSIGNOR TO PNEUMATIC SCALE CORPORATION, LIMITED, OF QUINCY, MASSACHUSETTS, A CORPORATION OF MASSACHUSETTS.

BOX-MAKING MACHINE.

Application filed September 29, 1925. Serial No. 59,360.

This invention relates to a box making machine, and more particularly to a box banding or wrapping machine, and has for an object to provide a novel and improved construction of such machine, particularly adapted for use in banding boxes of irregular shape in a highly efficient manner.

To this end the invention consists in the box banding machine and in the structures, combinations, and arrangements of parts hereinafter described and particularly defined in the claims at the end of this specification.

In the drawings illustrating the preferred embodiment of the invention, Figure 1 is a side elevation of a sufficient portion of a box banding machine embodying the features of the present invention, to enable the invention to be understood; Fig. 2 is a detail in front elevation of a portion of the banding machine illustrated in Fig. 1; Fig. 3 is a view similar to Fig. 2 showing the parts in a different position of operation; and Figs. 4 and 5 are details of mechanism controlling the movement of the banding roll into operative position, as will be described.

The present invention is preferably embodied in a box banding machine of the general construction and having the general mode of operation of the box banding machine illustrated in the U. S. patent to Hogfeldt No. 996,856, July 4, 1911, and as illustrated in such patent and in Fig. 1 of the drawings of the present application such a banding machine comprises in general a box holder 10 comprising a block 12, upon which the box or box cover 13 to be banded is removably retained by a plurality of spring fingers 14. Provision is made for intermittently rotating the box holder 10 and the box 13 carried thereby in order to enable a presser roll 15 to press a banding strip against the periphery of the box or cover 13 upon the block, so that as the box is rotated, the banding strip is adhesively applied to the periphery of the box. As illustrated in Fig. 1, and as shown in said patent, the box holding block 12 is mounted upon the end of a sleeve 18 and the sleeve is intermittently rotated by an intermittent gear 20 meshing with a pinion 21 upon said sleeve (see Figs. 1 and 2). Provision is made for reciprocating the block 12 in order to move it from a position in which box blanks may be fed thereon by a suitable box blank feeding mechanism illustrated by the general reference 30, and which may comprise the mechanism illustrated in said patent, and for removing the banded box from the block 12 after the banding operation has been performed. For the purposes of the present invention, however, while it is to be understood that the mechanism comprising the main feature of the present invention is to be embodied in a banding machine of the character above referred to and illustrated in said patent, it is sufficient for a complete understanding of the present invention to consider the block 12 intermittently rotated by the interrupted gear 20 and pinion 21 for the reason that the present invention has to do with the mode of application of the banding strip by the presser roll or member, irrespective of the other general details of the machine.

It has been found that when banding boxes of rectangular shape, particularly boxes of an oblong shape having unequal dimensions, that when the machine was operated at relatively high speed, such for example as 20 R. P. M. with shoe boxes, a tendency existed for the presser roll 15 to be thrown outwardly in passing the corner of the box between the longer and shorter sides of the box, that is as the presser roll travelled along the longer side and turned the corner to traverse along the shorter side of the box. The thrust upon the presser roll exerted by the box at this time caused the presser roll to continue to move beyond the corner of and away from the box as it left the longer side, and by the time that the presser 15 had been returned by its spring 32 an inch or more of the box had passed, so that in a completely banded box at each corner there existed about an inch of the banded strip which had not been pressed against the box by the presser roll. This detracted from the appearance of the box, caused the displacement of the last end of the banding strip from proper position or alignment, and in general was unsatisfactory from the user's point of view.

In accordance with the present invention this defect occurring in banding machines has been overcome so that the presser roll or member 15 is caused to contact with the periphery of the box during the time that the banding member is passing around the corner of the box, even though the dimensions of the box differ greatly, and even though the box be rotated at relatively high speed. In other words the presser roll is caused to hug the corner of the box or cover when the latter is rotated at high speed.

Referring to the drawing, the presser roll 15, which heretofore in prior banding machines has had merely a single pivotal movement about a fixed center, is in the illustrated machine caused to not only move about its normal pivot, but also the normal pivot itself is moved through a definite arc of oscillation, and as a result of this combined movement of the presser roll 15, the latter is caused to hug the corner as it passes from each longer to each shorter side of the box. Referring particularly to Figs. 2 and 3, the box 13 to be banded is illustrated as held on the rotatable block 12, and at the start of each cycle of operation of the machine, the parts are in the position illustrated in Fig. 2, wherein the presser roll 15 is pressing the end of the banding strip against the shorter side 33, of the box 13, near the corner thereof. The presser roll 15 is mounted upon an arm 35 secured in a bell crank 36 pivoted upon a stud 37. The stud 37 is mounted in and supported by a bracket 38 of general U-shape having two arms 39, 40 and which is pivoted at its lower end upon a counter shaft 42 journaled in brackets 43 bolted to the machine frame 44. It will therefore be observed that the presser roll or member 15 is capable of two pivotal movements, one about the stud 37 as a center and a second movement about the counter shaft 42 as a center. The second arm of the bell crank 36 is connected by the spring 32 to a fixed part of the frame 44 and the spring 32 operates to yieldingly maintain the presser roll 15 against the periphery of the box during the banding operation and during such times as the banding roll is not positively held in an inoperative position, such as illustrated in Fig. 4 by mechanism which will be described.

Provision is made for pivotally moving or oscillating the two arm bracket 38, and consequently the stud 37 carried thereby and which forms the pivot for the presser roll, back and forth during the movement of the presser roll along each of the longer sides 41 of the box and as the presser roll is turning the corners in passing from the longer to the shorter sides of the box. The movement of the bracket 38 in a direction to the right, viewing Figs. 2 and 3, takes place during the contact of the presser roll with approximately the first half of each of the sides 41 of the box, and the movement of the bracket 38 to the left, viewing Figs. 2 and 3, takes place during the contact of each of the longer sides 41 and as the presser roll is passing the corner from the longer to the shorter side of the box. It will be apparent from an inspection of Figs. 2 and 3 that the movement of the bracket 38 to the left causes the presser roll 15 to travel in a direction in which the box is rotated, and consequently to decrease at the rate of relative movement between the presser roll and the box, and as a result the effect produced is as if the presser roll was slowly moving around the corner of the box, thus enabling the spring 32 to maintain the presser roll in contact with the periphery of the box as the presser roll passes around the corner, and thus overcoming the objection of the presser roll leaving the box under the influence of the thrust of the box when the latter is rotated at relatively high speed. As herein shown, the interrupted or intermittent driving gear 20 is provided upon its side with a cam 50 having two sets of cam surfaces 52, 53 arranged to cause the above described oscillating movement of the arm 38 and the stud 37, and consequently the presser roll 15, during the traverse of the box from the position illustrated in Fig. 3 until the presser roll 15 rounds the approaching corner of the box, the presser roll is moved to the left with relation to the box thus cutting down the relative movement between the presser roll and the surface of the box as the latter rotates. As herein shown, the two-part bracket 38 is connected by an adjustable link 60 to a lever 62 pivoted at 63 in a bracket 64 attached to the machine frame, and the lever 62 is provided with a cam roll 65 adapted to ride upon the cam 50. At the start of the banding operation the parts are in the position illustrated in Fig. 2, and it will be observed that the cam roll 65 rests upon the concentric portion of the cam 50. When the cam roll 65 follows down the cam surface 52, the two-part arm 38 is swung through the connections described, to the right into the position illustrated in Fig. 3. During this movement, the presser roll 15 traverses along approximately the first half of the longer sides 41 of the box. Thereafter as the parts continue in operation the cam roll 65 rides up the surface 53, causing the movement of the presser roll bodily to the left and cutting down the rate of relative movement between the presser roll 15 and the surface of the box. This movement of the presser roll 15 to the left takes place as the presser roll 15 rounds the corner of the box, and it will be seen that even though the box be of oblong shape as illustrated, nevertheless, because of the fact that the presser roll 15 moves in the direction of movement of the box itself as the latter rotates during the portion of the operation in which the roll is moving from the position illustrated in Fig. 3 until it rounds the corner, the effect of the extreme thrust, which otherwise would be attained were the stud 15 stationary because of the difference between the radii at the side and the corner of the box and which for convenience and illustration are shown by the arrows 120, 121, is overcome, so that as the roll 15 rounds the corner of the box, ample opportunity is given for the spring 32 to cause the presser roll to follow the contour of the box, or to hug the box.

With the parts illustrated the cam is so designed that the rate of relative movement between the roll and the surface of the box along the long side of the box is substantially uniform with each unit of angular movement of the box, and in this manner the inequalities in the radii corresponding to the difference in the dimensions of the box are compensated for.

Provision is made for automatically moving the presser roll 15 from and into an inoperative position such as is illustrated in Fig. 4, wherein the presser roll is withdrawn from contact with the block 12 to thereby permit the banding strip to be fed between the presser roll and the block, and for this purpose, as herein shown, an arm 90 is revolubly mounted upon a stud 37 and is connected by an adjustable link 91 to a yoke 92 carrying a cam roll 93 which rides upon a cam 94, the latter revolving in timed relation to the movement of the rotatable block 12. The arm 90 is therefore positively swung to the left by the cam 94 into the position illustrated in Fig. 4 after the banding strip has been completely wrapped around the box or cover. The arm 90 is swung to the right under the influence of the coil spring 98 when permitted by the cam 94. Provision is made for disengageably connecting the presser roll 15 with the arm so that when the latter is swung to the left under the influence of its cam 94, the presser roll 15 is swung downwardly into an inoperative position illustrated in Fig. 4, and when the arm 90 returns, the coil spring 32 operates to rapidly swing the presser roll 15 into operative position illustrated in Fig. 2.

In Figs. 4 and 5 I have shown two modifications of means for disengageably connecting the arm 90 and the presser roll 15 to permit the presser roll to be operated in the manner just described. Referring to Fig. 4 the end of the arm 90 is provided with a pawl 95 which is urged by a spring 97 into engagement with the teeth of a ratchet 96 cast integrally with the bell crank 36 which carries the presser roll 15. When the arm 90 is moved to the left by the cam 94, the pawl engages the teeth of the ratchet and operates to cause the presser roll to be swung downwardly into the position illustrated in Fig. 4. When the cam 94 permits, the coil spring 98 operates to cause the arm 90 to be swung to the right. During this movement the pawl remains in engagement with the teeth of the ratchet until the pawl engages a pin 99 upon a block 100, whereupon the pawl is disengaged from the teeth of the ratchet 96 and this operates to permit the coil spring 32 to rapidly swing the presser roll up into operative position, illustrated in Fig. 2. Referring to Fig. 5, instead of the ratchet and pawl arrangement of Fig. 4, I may prefer to provide a set screw 102 adjustably mounted in the end of the arm 90, which is adapted to engage a lug 103 on the end of a member 104 cast integrally with the bell crank 36, so that when during the movement of the arm 90 to the left the set screw 102 engages the lug 103, the parts thereafter move as a unit to the left, swinging the presser roll into its inoperative position. During the return movement of the arm 90 the cam 94 is arranged to permit the coil spring 98 to swing the arm 90 out of the range of movement of the arm 104 during the movements of the presser roll 15 during the banding operation.

While the preferred embodiment of the invention has been illustrated and described, it is to be understood that the invention may be embodied in other forms within the scope of the following claims.

Having thus described the invention, what is claimed is:—

1. The combination with a rotatable box holder, of means for rotating the holder and the box carried thereby, a presser member for yieldingly pressing the band against the box to perform the banding operation as the box rotates, and means for moving the presser member during a portion of each cycle of rotation of the box holder to maintain the rate of the relative linear movement between the banding member and box substantially uniform.

2. The combination with a rotatable box holder, of a presser member for yieldingly pressing the banding strip against the box carried by the box holder, means for relatively rotating the box holder and presser member, and means for maintaining the rate of relative linear movement of the banding member and the surface of the box substantially constant during the contact of the banding member with portions of the box situated at different distances from the center of rotation thereof.

3. The combination with a rotatable box holder, of means for applying the banding strip around the periphery of a box carried by said box holder, including a pivoted presser member, a spring for yieldingly holding the presser member in contact with the periphery of the box, and means for causing the presser member to continuously press the banding strip against the box when the presser member is passing around a corner of the box and the box holder is rotated at relatively high speed, including means for moving the pivot for the presser member.

4. The combination with a box holder, of a movable presser for pressing a banding strip against the box, and to which presser a normal movement is imparted during the banding operation by the box being rotated, and means for moving the presser member with relation to the side of the box against which it presses, successively toward and away from the approaching corner of the box accordingly as the presser member approaches and passes the shorter axis of the box in its traverse along the side of the box.

5. The combination with a box holder, of a movable presser for pressing a banding strip against the box, and to which presser a normal movement is imparted during the banding operation by the box being rotated, and means for moving the presser member with relation to the side of the box against which it presses, away from the approaching corner of the box as the presser member approaches the corner of the box in the course of its normal movement.

6. The combination with a box holder, of a movable presser for pressing a banding strip against the box, and to which presser a normal movement is imparted during the banding operation by the box being rotated, and means for diminishing the rate of relative linear movement between the presser and the side of the box as the presser approaches the corner of the box.

7. The combination with a box holder, of a presser member for pressing a banding strip against the box, means for relatively rotating the box holder and presser member to perform the banding operation, and means operating automatically and in timed relation to the banding operation for diminishing the rate of relative movement between the presser member and box for the purpose specified.

8. The combination with a rotatable box holder, of means for rotating the box holder and a box carried thereby, a presser member for performing the banding operation, a spring for yieldingly urging the presser member against the box, and separate means acting on the presser member for diminishing the thrust of the box on the presser during the rotation of the box holder for the purpose specified.

9. The combination with a box holder, of a yielding presser member for pressing a banding strip against the box, means for relatively rotating the box holder and presser member to perform the banding operation, and means for automatically diminishing the thrust of the box on the presser during the rotation of the box holder.

In testimony whereof I have signed my name to this specification.

STANLEY R. HOWARD.